United States Patent [19]
Hertel

[11] 3,813,747
[45] June 4, 1974

[54] CUTTING TOOL
[76] Inventor: Karl Hertel, Oedenberger Str. 29, D-8500 Nuernberg, Germany
[22] Filed: Dec. 15, 1972
[21] Appl. No.: 315,312

[30] Foreign Application Priority Data
Dec. 23, 1971  Germany............................ 2164093

[52] U.S. Cl. ................................................. 29/96
[51] Int. Cl. ............................................. B26d 1/00
[58] Field of Search................................. 29/96, 95

[56] References Cited
UNITED STATES PATENTS

| | | | |
|---|---|---|---|
| 3,142,110 | 7/1964 | Hertel | 29/96 |
| 3,226,797 | 1/1966 | Hertel | 29/95 |
| 3,238,600 | 3/1966 | Milewski | 29/96 |
| 3,289,272 | 12/1966 | Stier | 29/96 |
| 3,314,126 | 4/1967 | Stier | 29/96 |
| 3,416,209 | 12/1968 | Contrucci et al. | 29/96 |

*Primary Examiner*—Leonidas Vlachos
*Attorney, Agent, or Firm*—Spencer & Kaye

[57] ABSTRACT

A cutting tool for a machine tool such as a lathe including a tool holder having a recess formed therein, in which is positioned a cutting body provided with at least one aperture. Engaged in the aperture is a pin, which is fitted in an associated bore in the tool holder, the pin being biassed laterally to hold the cutting body against the base of the recess. The bore is of slot-like cross-section, at its end near the recess, so as to give unilateral loose play for the pin in one radial direction only, in a direction to clamp the cutting body against the base of the recess. Preferably the major axes of the slot-like cross-section of the bores, where two or more are provided, are at an angle to one another.

The biassing means may be in the form of a fixing screw or anchor passes between two pins and is provided with a lateral recess or groove in which the pins are engaged.

15 Claims, 10 Drawing Figures

PATENTED JUN 4 1974

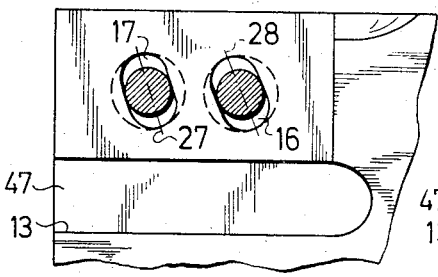
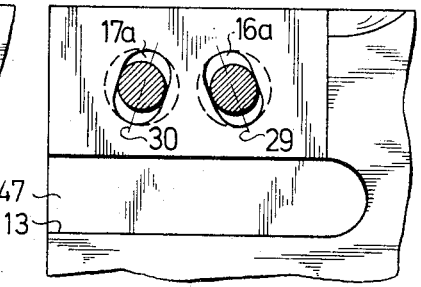
Fig. 3  Fig. 4
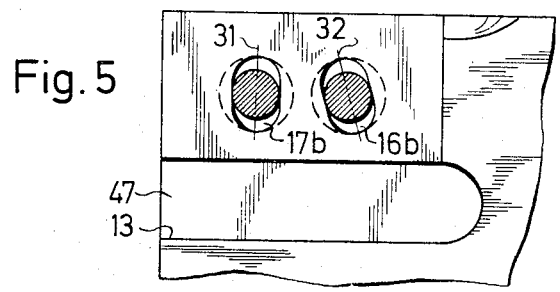
Fig. 5

Fig. 9b

CUTTING TOOL

BACKGROUND OF THE INVENTION

The invention relates to a cutting tool, for a machine tool, such as a lathe.

One known form of a cutting tool includes a tool holder having a recess formed therein in which is positioned a cutting body provided with at least one aperture. Engaged in the aperture is a pin, which is a loose fit in an associated bore in the tool holder, the pin being biassed laterally to hold the cutting body against the base of the recess.

SUMMARY OF THE INVENTION

It is the object of the invention to provide an improved a cutting tool of the above mentioned kind and to render its clamping action even more secure.

According to the invention, there is provided a cutting tool comprising a tool holder having a recess therein, at least one bore extending through the tool holder and opening into the recess, and having a non-circular cross-section which is only elongated in one radial direction, a cutting body positionable in said recess, at least one aperture formed in said cutting body positioned to be in alignment with said bore in said holder, a pin passing through the or each bore and into the associated aperture to locate said cuttinb body, the or each pin having loose play in the one radial direction only, but otherwise being guided by the associated bore, and means biassing the or each pin laterally so as to urge the cutting body against the tool holder.

Preferably the or each bore has the cross-sectional configuration of a slot and the longitudinal axis of the slot is oriented in the direction of the desired clamping pressure. Thus, depending on the direction of the longitudinal axis, the pin can exert on the cutting body a clamping action of any required orientation, independently of the orientation of the biassing means applying the clamping thrust.

A further development of the invention provides for the or each pin to be guided within the bore of the clamping tool holder at either side of the point of engagement of the biassing means. This enables the desired clamping direction of the or each pin to be yet more precisely aligned. Moreover, the possibility is thus given for the unilateral orientation of the loose play of the bore to be present only in that region of the tool holder which is situated between the point of engagement of the biassing means and the recess for reception of the cutting body, while in the remaining region of the bore all-round free play of the pin mounting is provided. Production is thereby simplified since slot milling need only be performed in that region of the tool holder which is situated between the point of engagement of the biassing means and the recess for the cutting body.

Advantageously the cutting body has a plurality of perforations and a corresponding plurality of pins to be mounted in the tool holder. Each bore can then exhibit a unilateral radial play in a different direction. This is of special importance for secure, non-oscillating mounting of a cutting body. Above all, this enables clamping of such cutting bodies as are supported within the recess, by contact with a sidewall thereof, only with respect to the principal cutting pressure acting on the cutting body but not relative to reaction pressure and/or advancing thrust.

Further, two adjacent pins may be pressurised by a common biassing means. In this case it is contemplated that the biassing means be a screw screwed into the tool holder, provided with a peripheral groove and extending between the pins substantially perpendicularly of their longitudinal axis, and that at least a portion of the cross-section of the pins lies within the groove, such that they are jointly biassed by the screw, in a radial direction. Thus in this embodiment the clamping thrust is originally applied by the biassing means.

In order that the effective cross-section of the biassing means should not be excessively weakened in the zone of engagement at the pins, it may further be envisaged for there to be a tension anchor or tie rod disposed between the pins, substantially perpendicular to their longitudinal axis, that in the region of the pins, the anchor being provided with lateral reception grooves at least partially surrounding the pins, and that the anchor itself may be biassed by screw pressure.

The aperture or apertures preferably open into the free surface of the cutting body.

The cutting body may have the configuration of two prisms of swallowtail cross-section, assembled head to head and with the free surfaces as outwardly lying swallowtail base surfaces.

The edges of the base surfaces of both prisms may extend parallel to one another. But for shaping machining purposes or depending on the desired chip removal the prisms may be somewhat turned relative to one another, about an axis extending perpendicularly of their base surfaces. The relative rotation may be clockwise or anti-clockwise, depending onn whether the cutting body is to be fitted into a tool for righthand or lefthand cutting.

Also, for the purpose of shaping by chip removal, the thrust edges of the two prisms may be rounded off in the region of the machining faces (lateral prism surfaces).

In order to make the cutting tool for the above mentioned cutting bodies, having differing mutual rotation, universally applicable, it is further proposed that the side surfaces of the prisms which are in at rest position and opposed to the principal cutting pressure be supported on a bearing body resting on the bottom of the clamping tool holder recess, that the surface of the bearing body facing the cutting body be convexly arcuately domed so as to be substantially part cylindrical, and that the bearing body be pivotable about an axis extending substantially perpendicular to its surface contacting the clamping tool holder. In this context the bearing body may be displaceable to some extent perpendicular to its pivot axis.

BRIEF DESCRIPTION OF THE DRAWINGS

The invention will be more fully understood from the following description, which is given only by way of example, reference being made to the accompanying drawings in which:

FIG. 3 is a side elevation of the recess in the clamping tool holder, as viewed in the direction of the arrow III of FIG. 1;

FIGS. 4 and 5 are views similar to FIG. 3, illustrating two modified embodiments;

FIG. 9b is a section taken along line IX—IX of FIG. 8 through a modified embodiment having more deeply countersunk internal cone surfaces for the securing aperture.

DESCRIPTION OF THE PREFERRED EMBODIMENTS

Figure 1:
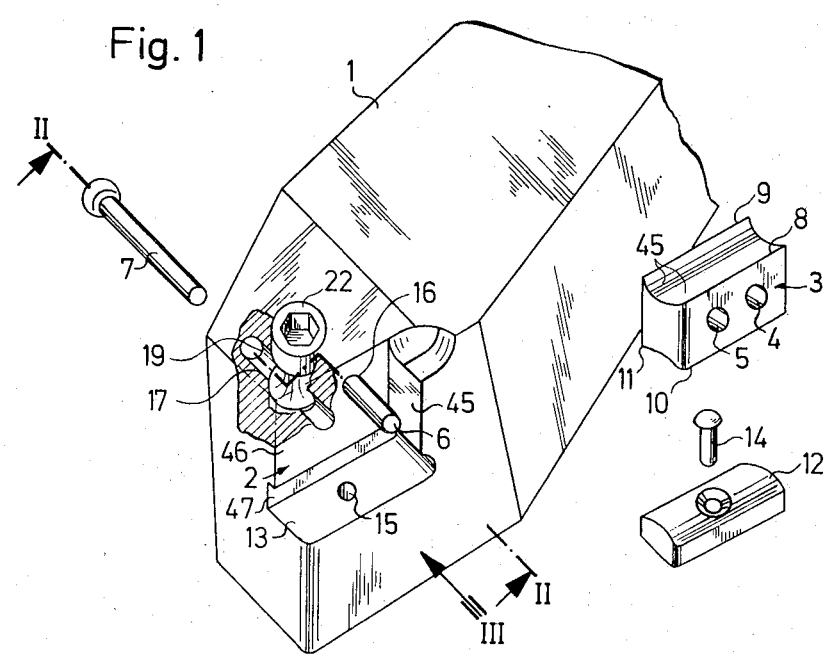
FIG. 1 is an exploded view in perspective, partially broken away, of one embodiment of cutting tool according to the invention.

The cutting tool illustrated in the Figures essentially comprises a tool holder 1 provided at its front with a recess generally designated by the reference numeral 2 for receiving the cutting body 3. Provided in the cutting body 3 are two apertures 4,5 in which are fitted securing pins 6, 7, the apertures 4,5 opening into the free surfaces of the cutting body 3. The cutting body 3 is a swivelling cutting body having, in all, four cutting edges 8,9,10,11. The cutting body 3 rests within the recess 2 on a bearing body 12. The bearing body 12 rests on the bottom 13 of the recess 3 where it is secured with lateral play by means of a pin, preferably a splined pin 14, located in the bore 15 of the clamping tool holder 1.

The pins 6,7 rests within corresponding bores 16,17 in the clamping tool holder 1, the bores being substantially aligned with the apertures 4,5 in the cutting body 3.

The bores 16,17 for reception of the securing pins 6,7 have loose play in only one specific radial direction while in the other directions they are mounted within the bores 16,17 with conventional sliding seating. In other words, the cross-sectional shape of the bores 16,17 is that of a slot (FIGS. 3–5). The diameter of the rearward end of the bores 16,17 is enlarged. This enlarged zone is designated by the numeral 18 in FIG. 2. By virtue of the enlargement of the diameter a shoulder 19 is formed between the enlarged portion 18 and the bores 16,17. At their rearward ends the pins 6,7 are provided with a head 20 of spherical calotte shape which rests on the shoulder 19 of the bores 16,17 and a securing screw 21 is screwed into the tool holder 1 in such manner that the securing pins 6,7 cannot inadvertently be withdrawn from the bores 16,17 towards the rear.

Figure 2:
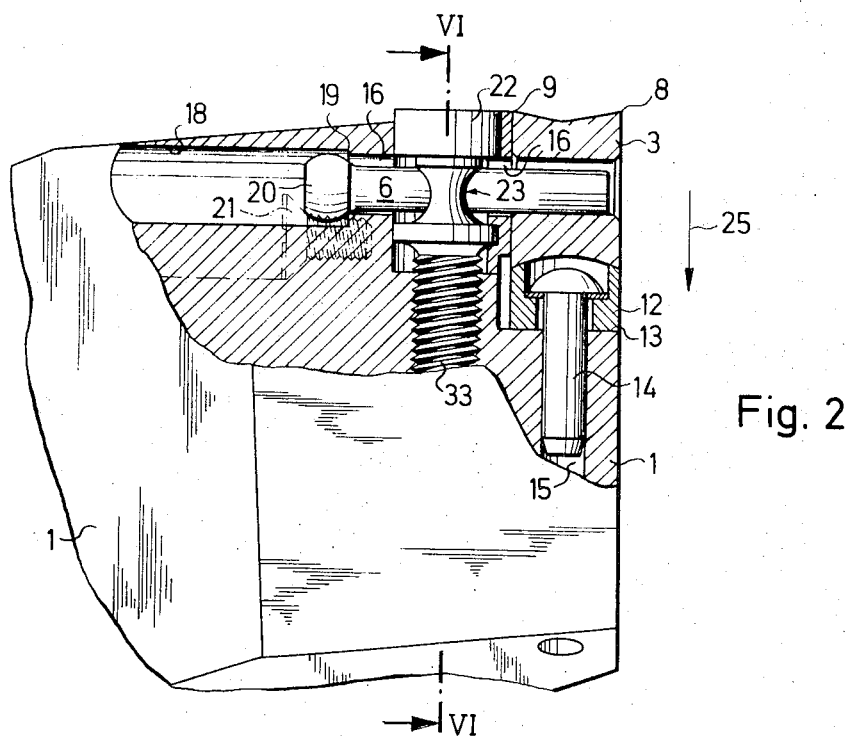
FIG. 2 is a section taken along the line II—II of FIG. 1 and illustrating the cutting tool in its assembled condition.

A fixing screw 22 is directly screwed by means of a thread 33 into the holder 1 between the two securing pins 6,7 in a plane extending substantially perpendicular to their longitudinal axes. The fixing screw 22 serves as biassing means for the pins 6,7, and is provided with a peripheral groove 23 at the level of the securing pins 6,7. The spacing between the two securing pins 6,7 is chosen to be such that at least part of their cross-section lies within the annular groove 23 of the fixing screw 22. Thus, when the screw 22 is tightened the securing pins 6,7 are biassed in a radial direction (arrow 25). The bores 16,17 within the clamping tool holder 1 are so designed that the pins 6,7 are guided within the tool holder 1 at either side of the fixing screw 22. It is only absolutely necessary for the bores 16 and 17 to give unilaterally oriented radial play in the region to the right, as seen in FIG. 2, of the fixing screw 22. In the region to the left of the fixing screw 22, the securing bores 16,17 may have an all-round radial play.

The slot-like cross-sectional configuration of the securing bores 16,17 or 16a,17a or 16b,17b is particularly apparent in FIGS. 3 to 5. The direction of the major axis of the slots of the bores receiving the securing pins 6,7 may vary. The major axis directions 27,28 may be parallel (FIG. 3), but the major axis directions 29,30 may alternatively be at an angle to one another, the direction of the major axis 29 being downwardly oriented toward the right while that of the major axis 30 is downwardly oriented toward the left (FIG. 4).

In the embodiment according to FIG. 5 the major axis 31 of the bore 17b is vertically downwardly oriented in the direction toward the contact surface 13, while the major axis 32 of the bore 16b is oriented downwardly toward the right.

Figure 6:
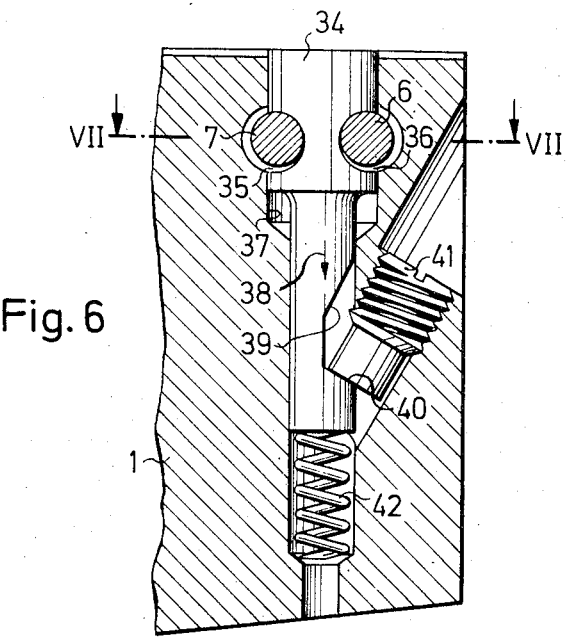
FIG. 6 is a section through a modified embodiment of cutting tool substantially analogous to a section taken along the line VI—VI of FIG. 2, although the FIG. 2 illustration represents a different embodiment.
Figure 7:
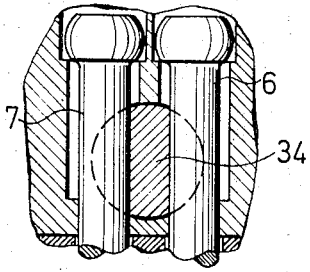
FIG. 7 is an enlarged section taken along the line VII—VII of FIG. 6.

In the embodiment of FIG. 6 a tension anchor 34 is used instead of the fixing screw 22. The tension anchor is provided with lateral receiving grooves 35,36 which partially surround the securing pins 6,7. The tension anchor 34 rests with play seating in a receiving bore 37 of the clamping tool holder 1. It is mounted so as to be displaceable in an axial direction 38. At its lower end it has a notch-like recess 39 which has a slope 40 at its side facing away from the grooves 35,36. The slope 40 is biassed by a grub screw 41, screwed into the tool holder 1. When the grub screw 41 is tightened the tension anchor 34 is drawn downward in the direction of arrow 38.

The lower end of the tension anchor 34 contacts a compression spring 42 bearing on the tool holder 1 and urging the tension anchor 34 out of the bore 37 when the grub screw 41 is relaxed.

The cutting body 3 illustrated in FIG. 1 has substantially the shape of two prisms of swallow-tail-like cross-section and joined in head-to-head relationship, and with the free surfaces as outwardly lying swallowtail base surfaces. The edges of the base surfaces of the two prisms extend parallel to each other. This means that the cutting edges 8 or 11 are parallel.

Figure 9A:
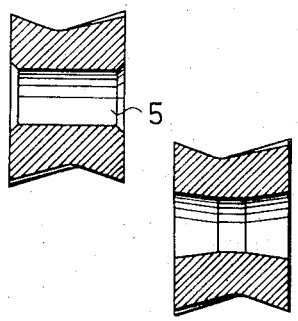
FIG. 9a is a section taken along line IX—IX of FIG. 8.
Figure 8:
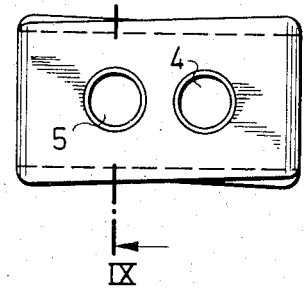
FIG. 8 is the side view of a modified embodiment of the cutting body shown in FIG. 1.

In the embodiment of FIG. 8 the prisms are slightly turned relative to each other, about an imaginary axis extending perpendicularly of their base surfaces. In the embodiment of FIG. 1, the thrust edges of the two prisms are rounded off in the region of the chip surfaces 45. The same applies to the embodiment according to FIGS. 8 and 9 where the two prisms are slightly relatively rotated about the aforesaid imaginary axis (FIG. 8). The surface of the bearing body 12 facing the cutting body 3 is of arcuate configuration, being convex and substantially part-cylindrical. The longer sides of the rectangles of the base surfaces of the prisms are identical with the cutting edges 8 to 11.

The cutting body 3 is directly braced against the reaction pressure acting thereon by the contact surface 45 of the recess 2. The lateral face 46 of the recess 2 provides bracing against the advancing pressure, directly on the tool holder. The bores 16,17 open into the recess 2 in the region of the lateral face 46. An undercut 47 is provided below the contact face 46 so as to afford some rotatability of the bearing body 12 about the pin 14.

In order to secure the cutting body 3 (FIG. 2) the axially largely fixed securing pins 6,7 i.e. fixed by the screw 21, are first inserted into the apertures 4,5 of the cutting body 3. The cutting body 3 now rests on the bearing body 12 within the recess 2. The fixing screw 22 is then tightened. A pressure in the direction of arrow 25 is thereby exerted on the two securing pins 6,7 which thus urge the cutting body 3 downwardly in the respective directions of the major axes 27 to 32 of the slots.

The same applies in analogous manner to the embodiment of FIG. 6, but in this construction the tension anchor 34 is not turned as is the fixing screw 22. Turning of the grub screw 41 urges the tension anchor 34 downwardly in the longitudinal direction 38 and thus produces the radial pressures required for biassing the securing pins 6,7. The direction of these radial pressures is again determined by the orientation of the major axes 27 to 32 of the slots.

What I claim is:

1. A cutting tool comprising, in combination:
   a. a tool holder;
   b. means defining a recess in said tool holder;
   c. means defining at least one bore extending through said tool holder and opening into said recess, said bore in said holder having a slot shaped cross-section, with said slot having its longitudinal axis extending only in one radial direction;
   d. a cutting body positionable in said recess;
   e. means defining at least one aperture in said cutting body positioned to be in alignment with said bore in said holder;
   f. pin means extending along a longitudinal axis through said bore defining means and into said aperture defining means effective to locate said cutting body, said pin means having unilateral loose play along said longitudinal axis of said slot of said bore defining means, where said longitudinal axis is oriented along a desired direction for movement of said pin means for providing a desired clamping thrust, but otherwise being guided by said bore defining means; and
   g. means applying a biassing force to said pin means in a direction perpendicular to said longitudinal axis of said pin means for laterally urging said cutting body against said tool holder.

2. A cutting tool as claimed in claim 1, wherein said pin means is guided at either side of the point of engagement of the biassing means within said bore defining means of the tool holder.

3. A cutting tool as claimed in claim 1, wherein the unilateral loose play of said pin means in said bore defining means is present only in that region of the tool holder situated between the point of engagement of the biassing means and said recess for receiving the cutting body, while in the remaining region of the bore defining means all-round free play of the pin means is provided.

4. A cutting tool comprising, in combination:
   a. a tool holder;
   b. means defining a recess in said tool holder;
   c. means defining a plurality of bores extending through said tool holder and opening into said recess, each said bore in said holder having a non-circular cross-section which is elongated in one radial direction only;
   d. a cutting body positionable in said recess
   e. means defining a plurality of apertures in said cutting body, each positioned to be in alignment with a respective said bore in said holder;
   f. a plurality of pin means passing through corresponding said bore defining means and into corresponding said aperture defining means effective to locate said cutting body, each said pin means having unilateral loose play in said one radial direction only, but otherwise being guided by a respective said bore defining means; and
   g. means biassing each said pin means laterally effective to urge said cutting body against said tool holder.

5. A cutting tool as claimed in claim 1, wherein one of said bores has the unilateral loose play for the associated pins means in a different radial direction from that of another of said bores.

6. A cutting tool as claimed in claim 1, wherein two adjacent pins are biassed by a common biassing means.

7. A cutting tool as claimed in claim 6, wherein said biassing means is a screw, threaded into the tool holder, and extending between the pins substantially perpendicularly of their longitudinal axis, and further comprising means defining a peripheral groove in said screw, at least part of the cross-section of the pins lying within the groove such that they are jointly biassed in a radial direction by the screw.

8. A cutting tool as claimed in claim 6, wherein the biassing means is a tension anchor disposed between the pins substantially perpendicularly of their longitudinal direction, and further comprising means defining lateral grooves in said tension anchor, at least partially surrounding the pins, and screw means urging said tension anchor in an axial direction.

9. A cutting tool as claimed in claim 1, wherein said apertures extend completely through said cutting body.

10. A cutting tool as claimed in claim 1, wherein the cutting body has the shape of two prisms assembled head to head and of swallowtail-like cross-section and with the free surfaces as outwardly situated swallowtail base surfaces.

11. A cutting tool as claimed in claim 10, wherein the base surface edges of the two prisms extend parallel to one another.

12. A cutting tool as claimed in claim 10, wherein the prisms are slightly turned relative to each other about an axis extending perpendicular to their base surfaces.

13. A cutting tool as claimed in claim 10, wherein the thrust edges of the two prisms are rounded off in the region of the machining surfaces formed by the tips of said swallowtails.

14. A cutting tool as claimed in claim 10, and further comprising a bearing body supported by said recess, said bearing body having a convex arcuate substantially part-cylindrical face supporting said cutting body and engaging in one of said swallow-tail like cross-sections, and a pivot on the face of said bearing body opposite said convex face allowing limited pivotal movement of said bearing body.

15. A cutting tool as claimed in claim 14, wherein the bearing body is to some extent displaceable perpendicularly of its pivot axis.

* * * * *